Sept. 1, 1970 M. E. ANDERSON 3,526,355

CALCULATOR

Filed May 1, 1968 3 Sheets-Sheet 1

INVENTOR.

MAYNARD E. ANDERSON

BY Eckhoff and Hoppe

ATTORNEYS

CALCULATOR

Filed May 1, 1968 3 Sheets-Sheet 2

INVENTOR.
MAYNARD E. ANDERSON
BY
Eckhoff and Hoppe
ATTORNEYS

Sept. 1, 1970 M. E. ANDERSON 3,526,355

CALCULATOR

Filed May 1, 1968 3 Sheets-Sheet 3

INVENTOR.
MAYNARD E. ANDERSON
BY
Eckhoff and Hoppe
ATTORNEYS

United States Patent Office
3,526,355
Patented Sept. 1, 1970

3,526,355
CALCULATOR
Maynard E. Anderson, Pleasanton, Calif., assignor to Alyn-Dale, Inc., a corporation of California
Filed May 1, 1968, Ser. No. 725,747
Int. Cl. G06c 29/00
U.S. Cl. 235—59 24 Claims

ABSTRACT OF THE DISCLOSURE

A low-cost calculator having slide bars or equivalent means for actuating a plurality of numbered dials and including keys which remain in actuated position to permit verification of entry or trial entries, means for resetting or restoring the operated keys to a home position while simultaneously resetting the numbered dials to the original count shown thereon before key actuation, a keyboard and cover which supports and provides necessary guides for the operating mechanism, means for manually setting the machine to selectively add or subtract numbers, and a novel mechanism for affecting the carry-over of a number from one dial to the higher order dial and which allows the numbers to be entered in any order of key actuation.

This invention relates to calculators and more particularly to improvements in calculator constructions which enhance the manufacture of relatively inexpensive machines.

In brief, this application and invention teaches a calculator comprising a plurality of slide bars for selectively actuating numbered dials in an operation of addition or subtraction. Each slide bar is substantially aligned with a row of keys and is positioned to be engaged and deflected downwardly by the operation of any key in a row with which it is aligned. A plurality of latches, preferably formed integrally with and on the under side of the keyboard, engage the slide bars in what may be termed "home" positions. However, each slide bar may be disengaged from its respective latch by an operation of one of the keys in the row with which it is aligned. Disengagement of any one latch allows the associated slide bar to be moved under the force of a spring bias, said slide being moved a distance which is proportionate to the value of the actuated key.

Each movement of a slide bar may be translated to a rotational movement of the associated dial. The mechanism employed for translating the movement of the slide bars comprises a rack member having a pair of rack surfaces selectively engageable with a pinion mounted to one of the dials. A shiftable support is provided for engaging all pinions with one of the rack surfaces, the other rack surface of each rack being dsiposed on the opposite side of the pinions' axis of rotation. Thus, a movement of each slide bar in one direction affects an add-count with one rack surface and a subtract-count with the other rack surface.

A transfer device for carrying over the count from one dial to another is also provided. This device will effect a carry-over irrespective of the order of key actuation and is compatible with means for resetting or restoring each key to its "home" position.

A principal object of the present invention is to provide a calculator which may be manufactured at a relatively low cost.

Another object is to provide a calculator having the capacity for either adding or subtracting numbers.

Another object is to provide a calculator of the kind described having a relatively few number of parts, many of which may be made of plastic or relatively inexpensive materials utilizing low-cost manufacturing techniques.

It is a further object of the invention to provide a calculator of the kind described in which entries upon the machine may be verified or trial entries made and then selectively cleared.

Another object is to provide a calculator of the kind described including an improved transfer device for changing the count shown on one dial in response to predetermined positioning of the next lower order dial.

A still further object of the invention is to provide a calculator of the kind described including an improved actuating means for rotating a set of dials in response to the selection and actuation of a plurality of keys.

Various other objects of this invention will become apparent in view of the following detailed description and the accompanying drawings.

In the drawings forming a part of this application and in which like parts are identified by like reference numerals throughout the same, FIG. 1 is a perspective view of a calculator machine construction in a preferred manner contemplated by the teaching of this invention, portions of the keyboard and operating mechanism of the calculator being broken away to expose internal supports and operating mechanism;

GENERAL DESCRIPTION OF MACHINE AND OPERATION

Figure 1:
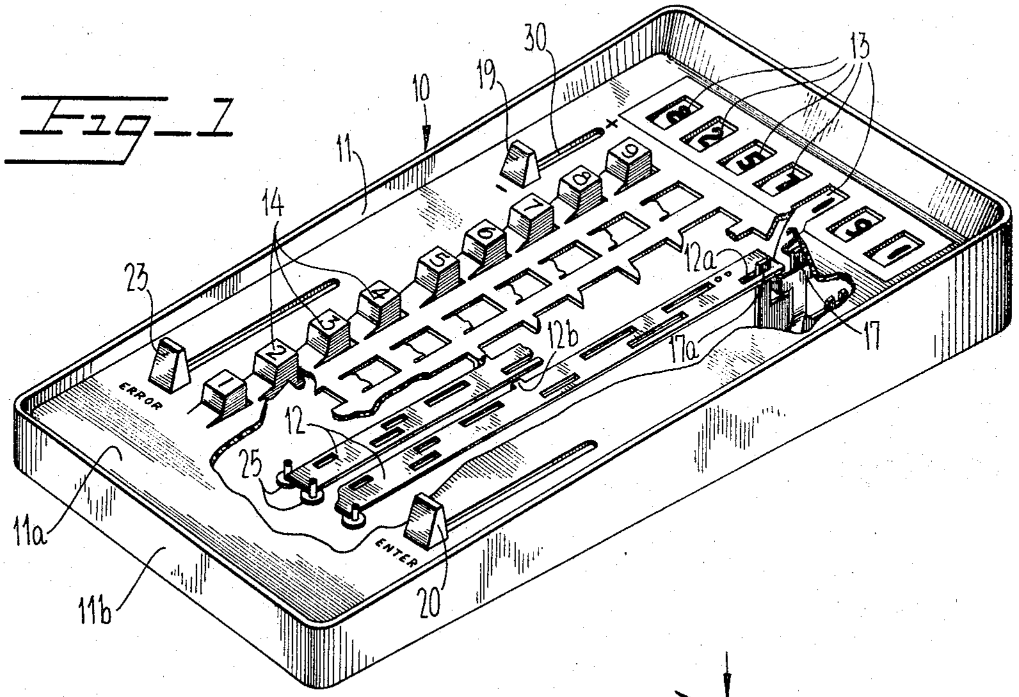
Figure 3:
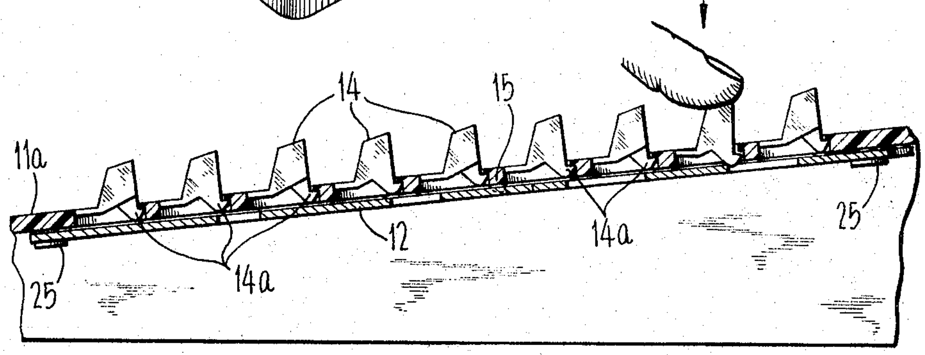
FIGS. 3, 4 and 5 are vertical sections through the keyboard illustrating various positions of actuation for one row of keys and its associated slide bar.
Figure 4:
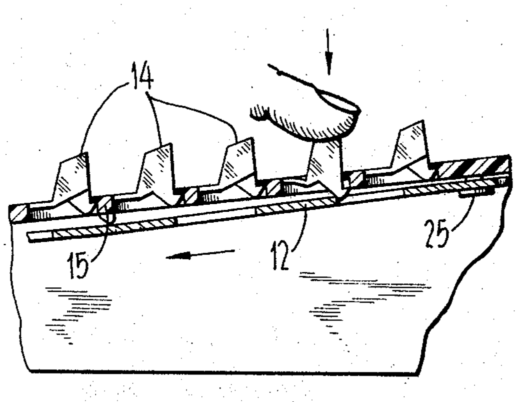
Figure 5:
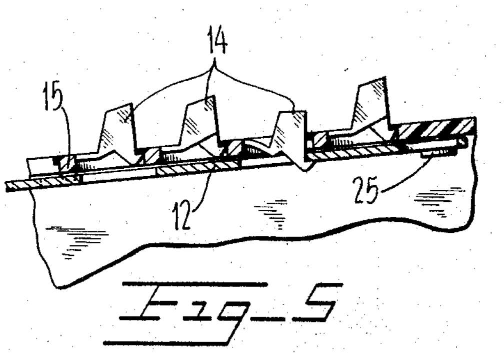
Figures 2, 6, 7, 8, 9:
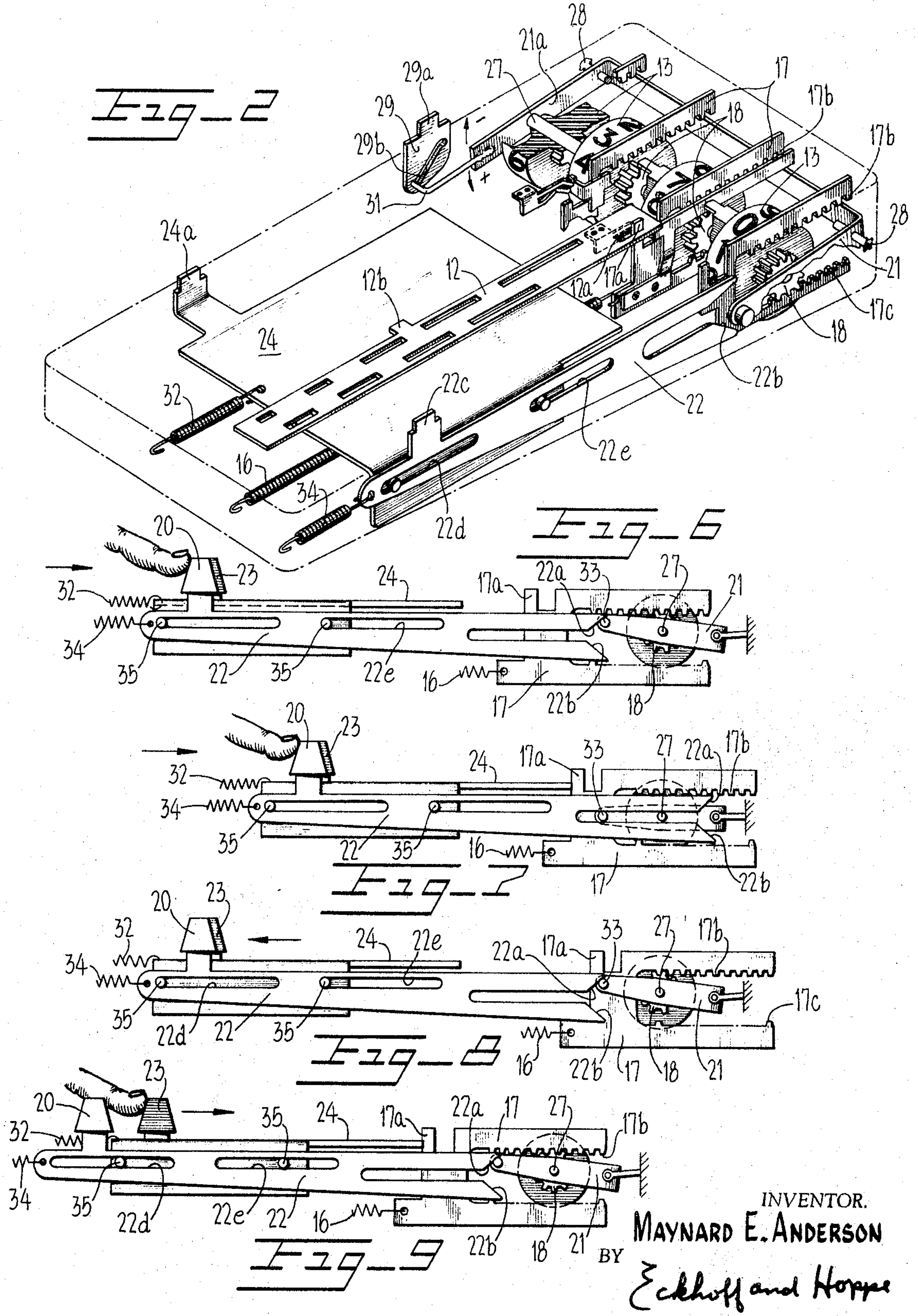
FIG. 2 is another perspective view of the calculator machine with keyboard removed and various parts and mechanism broken away or removed to illustrate other details of construction.
FIGS. 6 through 9 are elevations of the mechanism for entering a count by resetting all slide bars to their "home" positions.

Referring to FIGS. 1 and 2 in particular, there is illustrated a calculator 10 comprising a housing 11 that supports a plurality of reciprocally movable slide bars 12. Each slide bar serves as a control for selectively actuating one of a plurality of numbered dials 13. Each slide bar 12 is substantially aligned with a row of keys 14 which are formed integrally with housing 11, each key being resiliently attached as an appendage to the keyboard portion thereof. Thus, as shown in FIGS. 3–5, slide bars 12 are positioned to be engaged and deflected downwardly by the operation of any key in a row with which it is aligned.

A plurality of latches 15 integrally formed with and on the underside of the keyboard engages one of the slide bars, respectively, in what may be termed "home" positions. However, each slide bar may be disengaged from its respective latch by the deflection produced by pushing down on one of the keys in the row with which the slide bar is aligned. Disengagement of any one latch allows the associated slide bar to be moved under the force of a spring 16 and a connecting rack 17, said slide being moved a distance which is proportionate to the value of the actuated key.

The reciprocating movement of any one slide bar 12 may be translated to a rotational movement of an associated dial 13. Referring to FIGS. 6–9, the mechanism employed for translating the movement of the slide bars comprises the rack member 17 which has a pair of rack surfaces selectively engageable with a pinion 18. One pinion is coaxially secured to one of the dials 13 and rotates the connecting dial independently of the others. The pinions may also be placed in positions intermediate the rack surfaces such that neither surface is engaged. The positioning of pinions 18 is controlled by two finger-engageable tabs 19 and 20. Tab 19 (shown in FIG. 1) operates a pivoted bracket including an arm 21 upon which all pinions and dials are supported; and selective positioning of tab 19 allows all pinions to be engaged simultaneously with one rack surface or the other of associated rack members, one surface being used to add numbers and the other to subtract numbers.

Tab 20 is utilized to move a reciprocally movable arm 22 that engages a roll pin on arm 21 to center pinions 18 between the pair of rack surfaces to enter a count while restoring the actuated keys and slide bars to "home" positions.

The keys and slide bars may also be returned to "home" positions by actuating a slidable tab 23 on a reset plate 24. Tab 23 is operated when it is necessary or desired to clear the dials of a number placed thereon by key actuation. A typical example of using tab 23 would be to clear the dials of a number that had been placed thereon through error in actuating the keys.

A transfer device for carrying over the count from one dial to another is also provided. This device, best shown in FIGS. 10–12, will effect a carry-over irrespective of the order of key actuation and its operation is compatible with both means for resetting or restoring the keys to "home" positions.

A more detailed description of the machine and the manner in which it operates follows:

DETAILED DESCRIPTION OF CALCULATOR

Calculator 10 comprises a housing 11 formed of resilient plastic material and including a keyboard **11*a* and side frame 11*b*. A plurality of slide bars 12 are mounted from the under surface of the keyboard 11*a* upon pairs of guide posts 25. These guide posts are arranged to support the slide bars while allowing them to be deflected downward by actuating any one of the keys 14 in the row with which the slide bar is aligned. In this regard, keys 14 are arranged in rows, each row containing nine keys and each key in a given row being operatively associated with a slide bar 12 for actuating and setting a count upon one of the dials 13. More particularly, each slide bar 12 is substantially aligned with a row of keys 14** and is positioned to be engaged and deflected downwardly as shown in FIGS. 3 and 4.

Each slide bar 12 is formed with a plurality of staggered openings of varying length. These openings are positioned to receive a finger or latching appendage **14*a* of one of the keys in the row with which the slide bar is aligned, and the varying length of each opening is representative of the value of the key with which each is associated. Accordingly, an operation of key number "8," as shown in FIG. 3, places the finger 14*a* of that key in an opening having a length eight times as great as the length of opening associated with the finger 14*a*** of key number "1."

One end of each slide bar 12 is also formed with an opening **12*a* which receives an upstanding finger 17*a* forming a part of racks 17, each rack having a pair of opposed, facing rack surfaces 17*b* and 17*c*. The spacing between rack surfaces 17*b* and 17*c* is such that either one or neither of said rack surfaces may be engaged with pinions 17 coaxially secured to one of the dials 13, respectively. Each coaxially joined pinion and dial is freely mounted independently of the others upon a support rod 27 which, in turn, is mounted upon a pivoted bracket comprising a pair of interconnected arms 21 and 21*a*. Each arm is pivotally supported from the housing by a pin connection 28**.

The pivotal position of arms 21 and **21*a* determines which of the rack surfaces may be engaged by the pinions, and the positioning of the arms is determined by the setting of a slotted plate 29. This plate provides an ear 29*a* which projects through a slotted opening 30 formed in the keyboard and may be operated into one of two positions by the tab 19. One end of a resilient connecting rod 31 is secured to arm 21*a*, the other end of said rod being engaged in the angular slot 29*b* of plate 29. This connector translates the sliding movement of plate 29 to produce pivotal rotation of arms 21 and 21*a* upon pin connections 28**.

Parenthetically, it should be noted that the resiliency of connecting rod 31 is important as to permit arms 21 and **21*a* to be pivoted by a secondary control without moving plate 29. Such a control is imposed during the entering of a count and requires that pinions 18 be disengaged from both rack surfaces 17*b* and 17*c***.

Each of the racks 17 is adapted to be moved under the bias of coil spring 16, one end of each spring being connected to the lower end of support frame 11. However, an engagement between slide bars 12 and its associated rack 17 prevents movement of the rack except as may be allowed by movement of the slide bar itself. These engagements between the racks and slide bars form part of a transfer device described below.

It will be evident, nevertheless, that each slide bar 12 is acted upon by the bias imposed by the spring 16 which tends to move the slide bar beneath the row of keys with which it is aligned. Such movement, however, is impossible until the slide bar is deflected downward as to release an ear **12*b* from engagement with a latch 15 formed on the undersurface of the keyboard. Furthermore, upon such release, the slide bar will move under the force of the spring bias until the finger 14*a* of the actuated key engages the end of the slot in the slide bar with which it is aligned. Such engagement, as shown in FIG. 5, retains the key in a depressed condition and the key cannot be returned to its "home" position until the slide bar is moved against the spring bias and re-engaged with latch 15. Camming surfaces are preferably formed on the back surfaces of latches 15** to effect a smooth action in restoring the slide bars to their "home" positions.

Each of the slide bars is adapted to be returned to a "home" position by operation of either an error tab 23 or the enter tab 20. Error tab 23 is mounted to an upstanding finger **24*a* on a restore plate 24. This plate is supported and guided in housing 11 for reciprocal movement in the same direction as slide bars 12. But a spring member 32 imposes a bias upon the plate moving it downward and away from the fingers 17*a* on racks 17. Nevertheless, plate 24 may be brought into contact with each of the fingers 17*a* and moved to a degree that each of the slide bars 12 is returned to a "home" position where the appendages 12*b* engage latches 15**, respectively.

Referring to FIGS. 6–9, a secondary control for releasing the keys and returning the slide bars to "home" positions is provided by the arm 22 having a bifurcated end formed with sloped camming surfaces **22*a* and 22*b*. These camming surfaces are adapted for engaging a roll pin 33 mounted to arm 21 for centering pinions 18 relative to rack surfaces 17*b* and 17*c*. That camming surface which is used depends, of course, on the setting of control plate 29**.

Arm 22 is spring biased by a coil spring 34 which normally holds the arm in a retracted position. Nevertheless, the arm may be operated to move the camming surfaces **22*a* and 22*b* into engagement with roll pin 33 by manual operation of the tab 20 mounted upon an upstanding finger 22*c***.

Arm 22, it will be noted, is mounted upon plate 24, elongate slots **22*d* and 22*e* being formed for this purpose, each slot receiving a roll pin 35 mounted to plate 24. This construction allows restore plate 24 to be moved independently of arm 22 but it also allows a slight forward movement of the arm so that surfaces 22***a* or 22*b* may be engaged with roll pin 33.

More specifically, slots 22*d* and 22*e* are of sufficient length to permit plate 24 to reset each of the slides 12 to "home" positions without producing movement of arm 22. In addition, each slot extends in the opposite direction a distance sufficient to engage camming surfaces 22*a* or 22*b* with roll pin 33 and center pivoted arm 21, as shown in FIG. 7. At this point, however, the ends of each slot engages a roll pin 35 so that further movement of arm 22 also moves reset plate 24.

Figure 10:
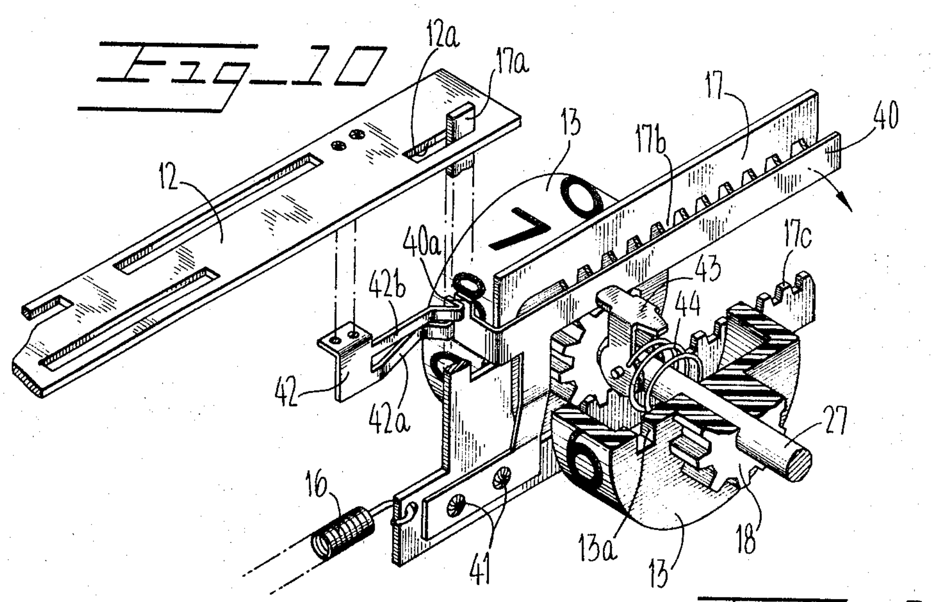
FIG. 10 is a perspective view illustrating a novel transfer or carry-over mechanism for initiating a movement of one rack in response to a predetermined positioning of the next lower order dial.
Figure 11:
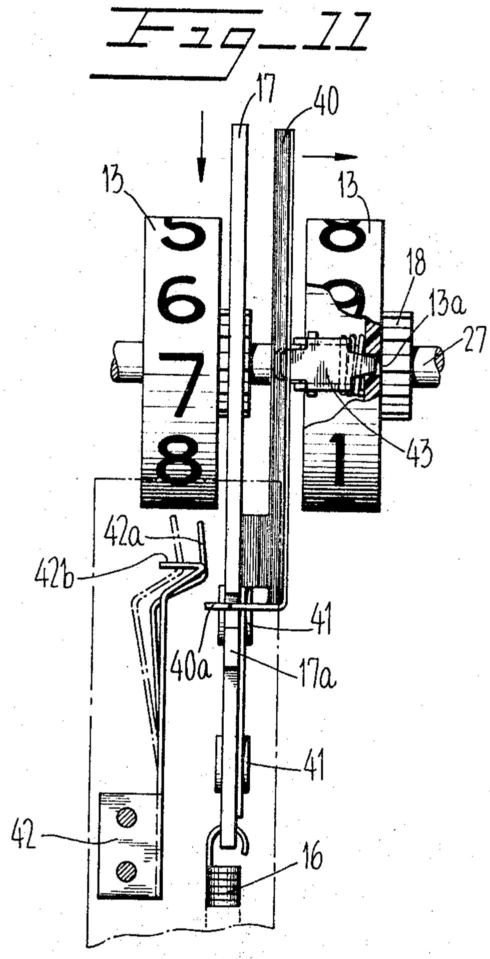
FIGS. 11 and 12 are plan views of the carry-over mechanism illustrating various positions of the mechanism during a carry-over operation.
Figure 12:
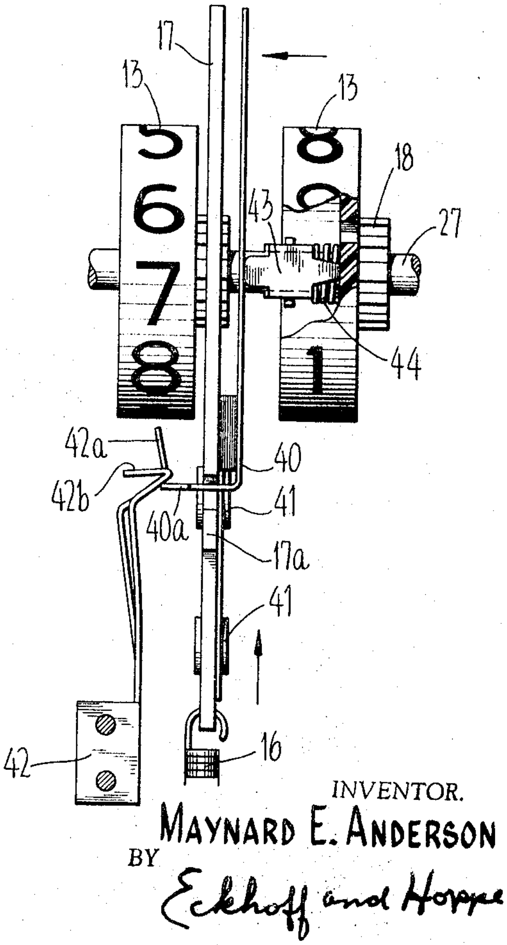

Referring to FIGS. 10–12 in particular, there is illustrated means by which slide bars 12 are interconnected with racks 17 by a transfer device for carrying over the count from one dial to another. One such device is provided for each dial, excepting only the lowest order dial. This mechanism generally comprises a carry lever 40 having a flange 40*a* and being pivotally attached to racks 17 by a pair of shoulder rivets 41. This connection is such that the carry lever may be moved through a small arc including one position with which it is in contact with a bifurcated carry spring 42 having a pair of legs 42*a* and 42*b*. Leg 42*a* acts as a pressure arm that urges the carry lever to move away from its supporting rack in the direction of the arrow shown in FIG. 10. Arm 42*b*, on the other hand, serves as a latch arm against which the carry lever abuts to provide a positive stop and drive connection between the carry lever and its associated slide bar 12. The force of pressure arm 42*a* is, under most conditions, resisted by a follower 43 pivoted upon rod 27 and acted upon by a coil spring 44 in opposition to the force of the latching arm.

With reference to FIGS. 11 and 12, dials 13 are formed with openings 13*a* located therein such that it is adapted to receive one end of follower 43 when the dial is rotationally positioned between the numbers "0" and "9." Thus, when the hole in the dial aligns with the follower, as shown in FIG. 11, carry lever 40 will move under the force of pressure arm 42*a* in the direction of the arrows shown in FIGS. 10 and 11, carry lever 40 being moved a sufficient distance to permit its release from latch arm 42*b*. Under such conditions, as shown in FIG. 11, rack 17 moves backward in the direction of slide bar 12 under the force of spring 16 until finger 17*a* engages the end of elongate slot 12*a*. The length of slot 12*a* allows rack 17 to move that distance necessary to rotate the associated dial 13 one-tenth of a revolution, thereby effecting a "carry"' of one number. If rack surface 17*b* is engaged with the pinion, then the count shown upon the actuated dial is lessened by one number. The engagement of surface 17*c*, of course, increases the number by one.

It is to be noted that arms 42*a* and 42*b* are both formed with offsets relative to the direct line of slide bar movement. These offsets provide clearance space for the carry lever 40 so that the lever, once released from latch arm 42*b*, is no longer under the force of carry spring 42*a*. This allows follower 43, under the biasing force of spring 44, to rise out of the opening 13*a* as the dial continues to turn. This feature is of particular importance where springs 16 apply only a relatively small force, as would be desirable for ease of operation. In addition, it is contemplated that very small pinions should be used to keep the travel distance of racks 17 and slide bars 12 to a minimum. This is of particular value in manufacturing a calculator having an acceptably small keyboard size; and the use of small pinions necessitates the use of low operating forces.

It is to be noted that both arms 42*a* and 42*b* must deflect past the edge of the carry lever 40 when slides 12 are restored, since follower 43 would not normally be aligned with the opening 13*a* during "restore." For this reason, latch arm 42*b* is flexible and resilient, as well as the latch arm 42*a*. In addition, both arms 42*a* and 42*b* are preferably formed with contact surfaces which may be engaged by the carry finger 40*a* and cammed backward, as shown in FIG. 12, to facilitate the restoration of the racks 17 and carry levers 40.

DESCRIPTION OF EXEMPLARY OPERATION

In operation, calculator 10 may be used to either add or subtract numbers. The particular character of the machine for adding or subtracting is determined by the setting of tab 19 which controls the settling of plate 29 and selectively positions pinions 18 into engagement with either rack surface 17*b* or 17*c*. However, in order to place the initial number or minuend upon the dials in preparation for a problem of subtraction, lever 19 should be moved into the position of addition for placing the minuend on the dial. (This assumes, of course, that all dials are originally set to zero.) A second number may then be subtracted therefrom by moving the tab 19 to the position shown in FIG. 1 and then pressing keys 14 in the several rows necessary to set up the subtrahend on the keyboard. As each key is depressed, it will deflect the slide bar 12 below, allowing the slide bar and its associated rack 17 to be moved under the bias of spring 16. This, of course, will rotate the associated pinion 18 and dial 13, rotating them that fractional turn necessary to subtract the number of the actuated key.

In the event that the number of the actuated key exceeds the number on the dial with which it is associated, there will be a "carry" reducing the number on the next highest dial by one. This "carry" is initiated when the opening 13*a* of the rotated dial becomes aligned with the end of follower 43 that controls the operation of the carry plate 40 mounted to the rack 17 which drives the next higher pinion and dial. As more particularly shown in FIG. 11, pressure arm 42*a* forces the carry lever 40 until it disengages the latch arm 42*b*. At this time, spring 16 retracts the rack 17 until finger 17*a* engages the end of slot 12*a*. This movement produces a one-tenth rotation and a "borrowing" from the next higher dial.

In the event that the subtrahend impressed upon the keys 14 was in error, the original minuend may be reinstated upon dials 13 by actuating error tabe 23. This action moves restore plate 24, engaging finger 17*a* and moving racks 17 and slide bars 12 to their original or "home" positions. It will be further evident that should there have been a "carry" or borrowing of one number from a higher order dial, the actuated carry lever 40 will be repositioned behind the associated latch arm 42*b* in a movement best shown in FIG. 12.

If the remainder number shown on dials 13 is to be used as the minuend for a second subtraction problem, then enter tab 20 is actuated to reset each of the keys 14, slides 12 and racks 17. This movement also disengages pinions 18 from rack surfaces 17*b* by an operation illustrated in FIGS. 6, 7 and 8. Inasmuch as arm 22 is mounted upon resorte plate 24 in a manner that actuates the restore plate upon full actuation of the arm, there is full restoration of the keys, slide bars and racks in the same manner as discussed in the preceding paragraph.

After the completion of any one problem, it may be desirable to reset dials 13 to zero. This may be done in either one of two ways with the apparatus shown. Obviously, it may be accomplished by adding or subtracting the necessary number to produce a zero reading upon each of the dials. A simpler method, however, would be to reset all keys 14, slides 12 and racks 17 to their home positions, as by actuating either error tab 23 or enter tab 20; then, centering each of the pinions 18 relative to the rack surfaces 17*b* and 17*c* by operation of tab 20, and manually resetting the dials by rotating each to zero. It is contemplated, however, that various other means may be provided for clearing the dials or resetting them to zero.

It will be apparent that the overall contruction of calculator 10 produces all adding and subtracting actions with an unually simple mechanism and with few operating parts. Moreover, although a preferred embodiment of the invention has been illustrated and described, various modifications and changes may be resorted to without departing from the spirit of the invention or the scope of the attached claims, and each of such modifications and changes is contemplated.

What is claimed is:

1. A calculator comprising: a plurality of numbered dials mounted for rotation; a plurality of slide bars mounted for reciprocal movement, one slide bar being provided for each dial; means interconnecting said dials with said slide bars, respectively, said means including a plurality of racks engageable with a plurality of pinions, respectively, each rack being operably movably with one of said slide bars, respectively, each pinion being operably movable with one of said dials, respectively; said racks having a pair of rack surfaces selectively engageable with one of said pinions, each pair of rack surfaces being engageable with an associated pinion on opposite sides of its axis of rotation, a movement of each slide bar in one direction effecting an add-count with one rack surface and a subtract-count with the other rack surface; means for moving said dials and pinions to selectively engage said pinions with one or the other of said rack surfaces of each rack, respectively; means for moving each slide bar and rack independently of other slide bars and racks; control means including a plurality of keys for initiating the movement of said slide bars from a home position and regulating the length of slide bar movement; and means for disengaging said racks from said pinions and resetting said slide bars into home positions.

2. The calculator of claim 1, said means for disengaging said rack surfaces from said pinions and resetting said slide bars comprising a crank arm from which said pinions are rotatably supported, and a shiftable lever chamfered and slotted at one end for engagement with said crank arm, the one end being engageable with said crank arm while said pinions are in either add-count or subtract-count positions, a movement of said lever into engagement with said crank arm centering each of the pinions relative to the associated rack surfaces and disengaging them therefrom.

3. The calculator of claim 1, and further including means for resiliently biasing said pinions into positions of engagement with one or the other of said rack surfaces.

4. The calculator of claim 1, said control means for initiating the movement of said slide bars and regulating the length of slide bar movement comprising a plurality of latching appendages operatively associated with said keys, respectively, each slide bar being substantially aligned with a row of latching appendages and movable in the direction of alignment, the actuation of each key associated with a given latching appendage positioning that latching appendage in the path of slide bar movement.

5. The calculator of claim 4, each slide bar being formed with elongate openings for receiving one of the latching appendages in the row with which the slide bar is aligned, respectively, the elongate openings being of different lengths representative of the value of the key with which each latching appendage is associated.

6. The calculator of claim 1, and further including means for resetting said slide bars into their home positions while said pinions remain in an engagement with associated racks.

7. The calculator of claim 1, said means for disengaging said racks from said pinions and resetting said slide bars comprising an error reset member slidably mounted for moving each of said slide bars into their home positions; and a shiftable lever for disengaging said racks from said pinions, said lever having a lost motion connection with said error reset member, whereby said error reset member may be moved to place said slide bars into their home positions without disengaging said racks from said pinions.

8. The calculator of claim 1, said means interconnecting said dials with said slide bars further including lost motion connections intermediate said racks and slide bars, respectively, each lost motion connection allowing a movement of the associated rack to change the count of its associated dial one number without moving the associated slide bar, and further comprising a transfer device for initiating a movement of said rack in response to zero positioning of the next lower order dial.

9. A calculator comprising: a plurality of numbered dials mounted for rotation; a plurality of slide bars mounted for reciprocal movement, one slide bar being provided for each dial; means interconnecting said dials with said slide bars, respectively, said means including a plurality of racks engageable with a plurality of pinions, respectively, each rack being operably movable with one of said slide bars, respectively, each pinion being operably movable with one of said dials, respectively, means for moving each slide bar and rack independently of other slide bars and racks; control means including a plurality of keys for initiating the movement of said slide bars from a home position and regulating the length of slide bar movement, said control means also comprising a plurality of latching appendages operatively associated with said keys, respectively, each slide bar being substantially aligned with a row of latching appendages and formed with elongate openings for receiving one of the latching appendages in the row with which the slide bar is aligned, respectively, the elongate openings being of different lengths representative of the value of the key with which each latching appendage is associated, the actuation of each key associated with a given latch positioning that latching appendage in the path of slide bar movement.

10. A calculator comprising: a plurality of number dials mounted for rotation; a plurality of slide bars mounted for reciprocal movement, one slide bar being provided for each dial; means interconnecting said dials with said slide bars, respectively, said means including a plurality of racks engageable with a plurality of pinions, respectively, each rack being operably movable with one of said slide bars, respectively, each pinion being operably movable with one of said dials, respectively; means for moving each slide bar and rack independently of other slide bars and racks; control means including a plurality of keys for initiating the movement of said slide bars from a home position and regulating the length of slide bar movement; and means for disengaging said racks from said pinions and resetting said slide bars into some positions, said means for disengaging said racks from said pinions and resetting said slide bars comprising an error reset member slidably mounted for moving each of said slide bars into their home positions, and a shiftable lever for disengaging said racks from said pinions, said lever having a lost motion connection with said error reset member; whereby said error reset member may be moved to place said slide bars into their home positions without disengaging said racks from said pinions.

11. The calculator of claim 10, said error reset member and lever being mounted for slidable movements in essentially the same direction, said reset member having a pair of roll pins engaged with elongated slots formed in said lever.

12. A calculator comprising: a plurality of numbered dials mounted for rotation; a plurality of slide bars mounted for reciprocal movement, one slide bar being provided for each dial; means interconnecting said dials with said slide bars, respectively, said means including a plurality of racks engageable with a plurality of pinions, spectively, each rack being operably movable with one of said slide bars, respectively, each pinion being operably movable with one of said dials, respectively, said means interconnecting said dials with said slide bars further including lost motion connections intermediate said racks and slide bars, respectively, each lost motion connection allowing a movement of the associated rack to change the count of its associated dial one number without moving the associated slide bar; transfer devices for initiating a movement of said racks, respectively, in response to predetermined positioning of the next lower order dial, each transfer device moving a rack with lost motion relative to the associated slide bar; means for moving each slide bar and rack independently of other slide bars and racks; control means including a plurality of keys for initiating the movement of said slide bars from a home position and regulating the length of slide bar movement; and means for disengaging said racks from said pinions and resetting said slide bars into home positions.

13. The calculator of claim 12, each transfer device comprising a carry lever pivotally mounted to a rack, a follower mounted between and engageable with said carry lever and the next lower order dial, said next lower order dial having an opening for receiving said follower, means pivotally biasing said carry lever against said follower and said follower against said dial, and latching means mounted to the slide bar associated with said rack and positioned to engage said carry lever and restrain its movement until said follower is received in the opening of said next lower order dial.

14. The calculator of claim 13, said latching means being resilient and having a latch arm that may be moved out of the path of said carry lever as its supporting rack moves into a home position.

15. In a calculator having a plurality of numbered dials mounted for rotation and means for rotating each dial independently of the other dials, each dial being interrelated to the other for registering numbers of more than one digit, an improved transfer device for changing the count shown on one dial in response to predetermined positioning of the next lower order dial, comprising: a carry lever pivotally mounted to and movable with means for rotating a dial; a follower mounted between and engageable with said carry lever and a lower order dial, the lower order dial having an opening for receiving said follower while said dial occupies a predetermined position of dial orientation; means biasing said carry lever against said follower and said follower against the lower order dial; and latching means positioned to engage said carry lever and restrain its movement and the movement of said means for rotating the dial until said follower is received in the opening of the lower order dial.

16. The transfer device of claim 15, said latching means being resilient and having a latch arm engageable with said carry lever, said latch arm being movable against the resilient bias of said latching means by said carry lever when said means for rotating the dial is returned to a home position.

17. The transfer device of claim 16, and further including a stop mounted on the means for rotating the dial, said stop being engageable with said latching means to position said latch arm for accurate latching.

18. In a calculator having a plurality of numbered dials mounted for rotation, each dial being interrelated to the others for registering numbers of more than one digit, means including a plurality of pinions and racks for rotating each dial independently of other dials, said pinions being rotatable with said dials and engageable with said racks, respectively, an improved means for changing the count shown on one dial in response to a predetermined positioning of the next lower order dial, comprising: a plurality of carry levers, each lever being movably supported from one of said racks, respectively; a plurality of followers, each follower being mounted between and engageable with one of said carry levers and a lower order dial, respectively; each lower order dial having an opening for receiving a portion of the engaging follower;

means biasing said carry levers against said followers and said followers against the lower order dials; means for moving said racks to turn said pinions and dials; and a plurality of latches, each latch being positioned to engage one of said carry levers, respectively, and restrain its movement and the movement of the supporting rack until the engaging follower is received in the opening of the next lower order dial.

19. The transfer device of claim 18, and further comprising a plurality of slide bars, and means interconnecting each slide bar with one of said racks, respectively, said means allowing limited lost motion between each slide bar and interconnected rack.

20. The transfer device of claim 19, said latches being supported upon said slide bars, respectively; said means for moving said racks comprising a plurality of springs, each spring being engaged with one of said racks, respectively, for applying a resilient bias to move the engaged rack with lost motion relative to said slide.

21. In a calculator having a plurality of numbered dials mounted for rotation and means for rotating each dial independently of the other dials, each dial being interrelated to the others for registering numbers of more than one digit, an improved actuating means comprising a keyboard formed with a plurality of openings; a plurality of keys resiliently mounted to said keyboard, said keys being positioned substantially within an operatively movable relative to an opening, respectively; a plurality of resilient slide bars disposed beneath said keyboard, each slide bar being substantially aligned with the row of keys and positioned to be engaged and resiliently deflected by the actuation fo any key in the row with which it is aligned; means resiliently biasing said slide bars in the direction of its alignment with a row of keys; and means engageable with said slide for separately latching each slide in a home position, said latching means being disengaged from a given slide by its deflection.

22. The actuating means of claim 21, each key supporting a latching appendage engageable with the slide bar, the actuation of each key positioning its latching appendage in the path of slide bar movement momentarily after deflecting the bar.

23. The actuating mechanism of claim 21, each slide bar being formed with elongate openings for receiving the latching appendage of associated keys, respectively, the elongate openings being of different length representative of the value of the key with which each is associated.

24. The actuating mechanism of claim 21, each slide bar being supported from the underside of said keyboard on both sides of an area engageable with the associated keys, each slide bar being formed with sections of substantially uniform width disposed between pairs of guide posts integrally formed on the lower side of said keyboard.

References Cited

UNITED STATES PATENTS

| | | | |
|---|---|---|---|
| 832,963 | 10/1906 | Flegel | 235—143 |
| 1,622,916 | 3/1927 | Malcher | 235—59 |
| 2,678,160 | 5/1954 | Hutton | 235—59 |
| 2,850,230 | 9/1958 | Smith | 235—59 |
| 3,315,885 | 4/1967 | Sato et al. | 235—60 |

RICHARD B. WILKINSON, Primary Examiner

S. A. WAL, Assistant Examiner

U.S. Cl. X.R.

235—145